United States Patent
Kubik et al.

(10) Patent No.: US 9,351,447 B2
(45) Date of Patent: May 31, 2016

(54) GARDEN SHEARS

(71) Applicant: MTD Products Inc, Valley City, OH (US)

(72) Inventors: Ingo Kubik, St. Wendel (DE); Markus Lissmann, Namborn-Baltersweiler (DE)

(73) Assignee: MTD PRODUCTS INC, Valley City, OH (US)

( * ) Notice: Subject to any disclaimer, the term of this patent is extended or adjusted under 35 U.S.C. 154(b) by 112 days.

(21) Appl. No.: 14/091,515

(22) Filed: Nov. 27, 2013

(65) Prior Publication Data

US 2014/0173913 A1 Jun. 26, 2014

(30) Foreign Application Priority Data

Nov. 28, 2012 (DE) .......................... 10 2012 023 295

(51) Int. Cl.
*A01G 3/02* (2006.01)

(52) U.S. Cl.
CPC . *A01G 3/021* (2013.01); *A01G 3/02* (2013.01)

(58) Field of Classification Search
CPC ........... A01G 3/021; A01G 3/02; A01G 3/06; A01G 3/065; B26B 13/00; B26B 13/28
USPC ............ 30/236, 244, 249, 254, 223, 245, 252
See application file for complete search history.

(56) References Cited

U.S. PATENT DOCUMENTS

| 1,074,852 | A | * | 10/1913 | Folgert | ............................. | 30/266 |
|---|---|---|---|---|---|---|
| 1,545,211 | A | * | 7/1925 | Storz | ................................ | 30/266 |
| 1,573,442 | A | * | 2/1926 | Feddersen | ............. | B26B 13/285 |
|  |  |  |  |  |  | 30/239 |
| 2,240,946 | A | * | 5/1941 | Vido | ................................. | 30/254 |
| 2,650,845 | A | * | 9/1953 | Dalley | ........................... | 403/162 |
| 2,831,248 | A | * | 4/1958 | Ward | ..................... | B26B 13/285 |
|  |  |  |  |  |  | 30/239 |
| 3,289,296 | A | * | 12/1966 | Hedstrom et al. | ............... | 30/267 |
| 3,672,053 | A | * | 6/1972 | Wiss | ............................... | 30/267 |

(Continued)

FOREIGN PATENT DOCUMENTS

| DE |  | 645651 C | * | 6/1937 |
|---|---|---|---|---|
| DE | 20 2008 013 249 |  |  | 1/2009 |

(Continued)

OTHER PUBLICATIONS

English translation of EP 0765717 which is equivalent to WO9631326.*

(Continued)

*Primary Examiner* — Kenneth E. Peterson
*Assistant Examiner* — Jennifer Swinney
(74) *Attorney, Agent, or Firm* — Wegman, Hessler & Vanderburg

(57) ABSTRACT

A gardening shears comprises a first blade (10) and a second blade (20) which are provided with respective hand grips (12, 22), respectively, and are rotatably connected to one another via a pivot connection (13, 23, 30, 41). The pivot connection comprises a pivot bolt (32) passing through respective bores (13, 23) of the first and second blade (10, 20), respectively and secures the blades (10, 20) in axial direction of the pivot bolt (32) to one another. The pivot bolt (32) comprises in its axial direction successive first and second peripheral sections (34, 35), the first peripheral section (34) being rotatably mounted over a limited angular region within the bore (13) of the first blade (10) whereas the second peripheral section being non-rotatably secured within the bore (21) of the second blade.

7 Claims, 3 Drawing Sheets

(56) References Cited

U.S. PATENT DOCUMENTS

| | | | |
|---|---|---|---|
| 4,104,794 A * | 8/1978 | Carroll | 30/268 |
| 4,473,947 A * | 10/1984 | Ishida et al. | 30/267 |
| 5,628,116 A * | 5/1997 | Kohno | 30/267 |
| 2005/0188543 A1 * | 9/2005 | Yeh | 30/254 |
| 2005/0193498 A1 | 9/2005 | Klecker et al. | |
| 2008/0184567 A1 | 8/2008 | Jou | |

FOREIGN PATENT DOCUMENTS

| | | | |
|---|---|---|---|
| DE | 20 2010 008 358 | | 12/2010 |
| DE | 202012103461 U1 * | | 11/2012 |
| DE | 202012103542 U1 * | | 12/2012 |
| DE | 202013104102 U1 * | | 11/2013 |
| EP | 0507712 * | | 10/1992 |
| EP | 0507712 A1 * | | 10/1992 |
| EP | 1916074 A1 * | | 4/2008 ............... A01G 3/02 |
| FR | 578067 A * | | 9/1924 |
| GB | 622386 A * | | 5/1949 |
| GB | 966058 A * | | 8/1964 |
| WO | WO 9631326 A1 * | | 10/1996 .............. B26B 13/04 |

OTHER PUBLICATIONS

English translation of FR 578067.*
English Translation of EP0507712.*

* cited by examiner

GARDEN SHEARS

FIELD OF THE INVENTION

This invention relates to garden shears of the type.

BACKGROUND OF THE INVENTION

Known garden shears of this type are provided in most cases with a spring which biases the two blades of the shears in the opening direction, wherein limiting means are provided to limit the extent of the opening of the blades.

Such limiting means for limiting the opening movement often have a complicated and failure prone structure with a plurality of components which is not desirable on reasons of manufacturing technology.

SUMMARY OF THE INVENTION

The object of the invention is to provide garden shears of the type mentioned above wherein the limiting means for the opening movement has a simple and reliable construction.

The garden shears according to the invention comprises in conventional manner a first blade and a second blade prolongated by respective hand grips and pivotably mounted to one another by means of a pivot connection, wherein the pivot connection comprises a pivot bolt passing through respective bores of the first and second blades and rotatably secures the blades to one another in the axial direction of the pivot bolt.

According to the invention, the pivot bolt comprises, in its axial direction, subsequent first and second peripheral portions, a first of these peripheral portions being disposed in the bore of the first blade and rotatable therein over a limited angular range, whereas the second peripheral portion is non-rotatably fastened within the bore of the second blade.

According to a preferred embodiment of the invention, the first peripheral portion of the pivot bolt comprises a substantially circular cross section, whereas the second peripheral portion comprises at least a flat which engages a complementary flat of the bore of the second blade such that the pivot bolt is non-rotatably connected to the second blade, whereas the pivot bolt comprises in the region of the first peripheral portion a projection extending into a radially directed extension of the bore of the first blade, the angular extent of the extension about the longitudinal axis of the pivot bolt being larger than the angular extent of the projection, such that the two blades may rotate over a limited angular range with respect to one another.

The first peripheral portion and the second peripheral portion preferably have an axial length which substantially corresponds to the thickness of the first and second blade, respectively, in the region of the respective bore.

According to one embodiment of the invention, the pivot bolt has, at its end adjacent to the first peripheral portion, a radially projecting flange in abutment with a surface at the outer main surface of the first blade, and the projection is formed by a pin extending axially through the flange into a region adjacent to the first peripheral portion.

In the same manner it is of course possible to form the projection by for instance a rib on the first peripheral portion of the pivot bolt, and further, a cinematic reversal may be considered wherein the bore of the first blade is provided with a projection projecting into the inside of the bore, said projection engaging into a recess of the first peripheral portion of the pivot bolt extending over a corresponding angular region.

The pivot connection further may comprise a second portion having a flange with a surface which abuts on the outer main surface of the second blade.

The pivot bolt may comprise, at its end adjacent the second peripheral portion, a threaded bore, whereas the second portion of the pivot connection comprises a threaded bolt which is screwed into the threaded bore.

It is further possible that the pivot bolt is provided with a threaded portion constituting an extension of the second peripheral portion, a threaded nut being screwable onto this threaded portion, the threaded nut being positioned on the outer side of the second blade and forming the second portion of the pivot connection.

BRIEF DESCRIPTION OF THE DRAWINGS

The invention shall be further explained in the following with reference to an embodiment thereof shown in the drawings.

In the drawings.

DETAILED DESCRIPTION

Figure 1:
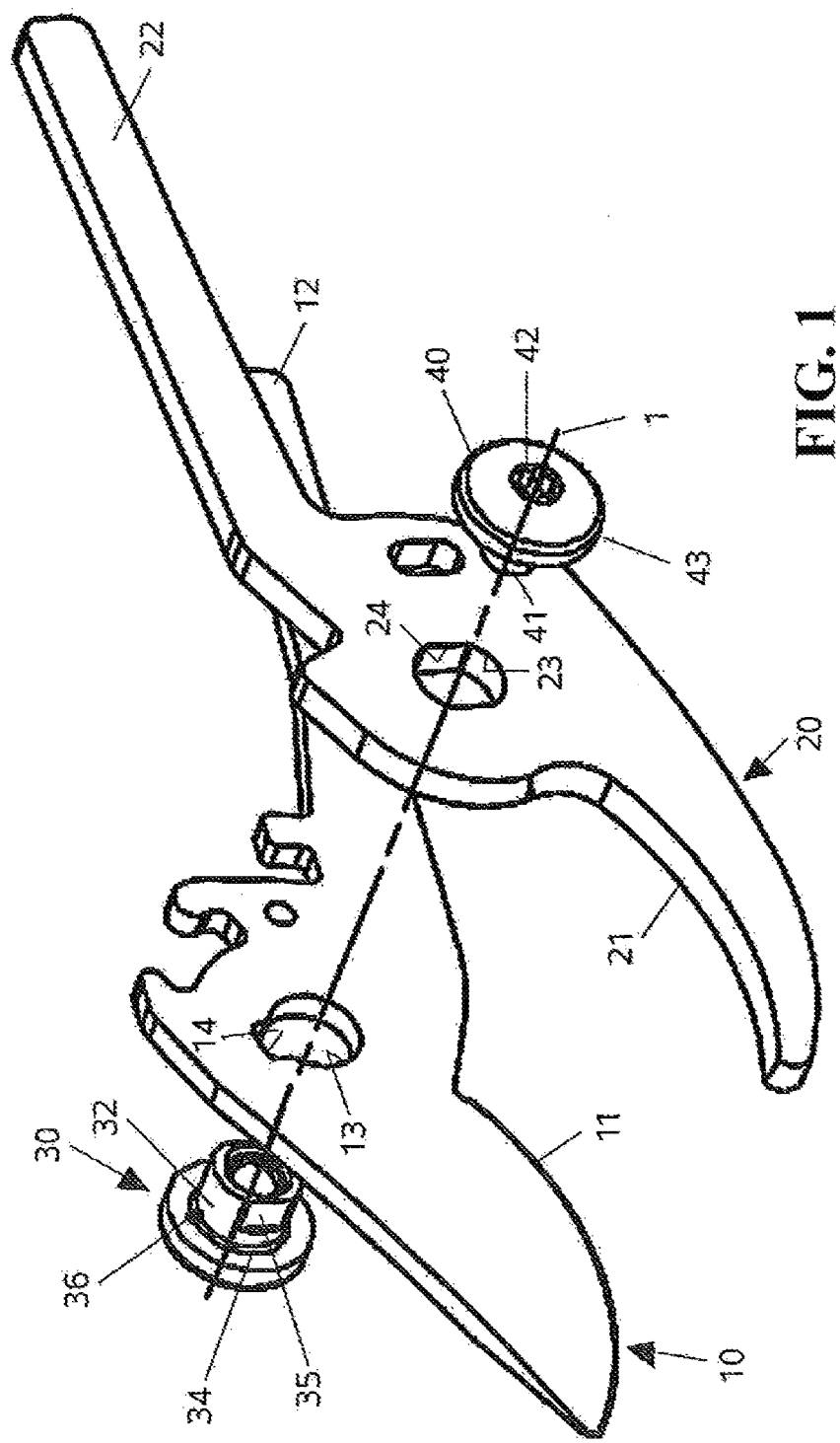
FIG. 1 shows the two blades of a gardening shears together with the pivot connection connecting these blades.

In FIG. 1 a first blade 10 and a second blade 20 are shown which are provided with respective hand grips 12 and 22 respectively, wherein the conventional covers of plastic material for the grips 12, 22 are left out on reasons of clarity.

The blade 10 may for instance be provided with a cutting edge 11 cooperating with a counter blade 21 at the second blade 20.

The two blades 10, 20 are rotatably connected to one another via a pivot connection 30, 40 wherein with the embodiment shown the pivot connection comprises a first portion 30 formed by a pivot bolt 32 having a threaded bore 33, and a second part formed by a screw 40 having a radially protruding flange 43 and a threaded bolt 41.

The screw 40 further comprises a tool formation 42, for instance formed by a slot or a hex socket.

This arrangement may be designed in a reversed manner, i.e. the pivot bolt forming the first portion 30 of the pivot connection may be provided with a threaded extension instead of the threaded bore 33, and a threaded nut disposed at the outside of the second blade 20 being threaded onto this threaded extension.

The pivot bolt 32 comprises in its longitudinal direction a first substantially circular peripheral portion 34 destined for being disposed in a bore 13 of the first blade 10 and having a length in axial direction of the shaft 32 corresponding substantially the thickness of the first blade within the region of the bore 13.

The pivot bolt 32 further comprises at least one second peripheral portion following to the first peripheral portion and having at least one flat 35 having a length extending in the axial direction of the pivot bolt 32 corresponding substantially to the thickness of the second blade 20, the bore 23 in the second blade having complementary flats 24 such that the pivot bolt 32 is non-rotatably held within the second blade 20, whereas the portion 35 of the pivot bolt 32 having a circular cross section is disposed freely rotatable within the bore 13 of the first blade, but is provided with limiting means for the rotational movement as set out below.

Instead of the at least one flat, the second peripheral portion further may have another cross sectional shape differing from a circular cross section which forms together with a complementary cross sectional shape of the bore of the second blade 20 a connection secured against a rotation relative thereto.

The limitation of the rotational movement and thereby of the opening width of the two blades 10, 20 is obtained by a projection 36 either of the pivot bolt 32 or the flange 31 of the first connecting means, which projects radially with respect to the first peripheral portion 34 and cooperates with a section 14 of the bore 13 of the first blade which has a larger radial distance from the pivot axis 1 than the remaining circular periphery of the bore 13.

By selecting the angular extent of the projection 35 or of the extension 14 of the bore 13, respectively, a desired limitation of the angle of the opening movement of the two blades 10, 20 may be obtained.

Figure 2:
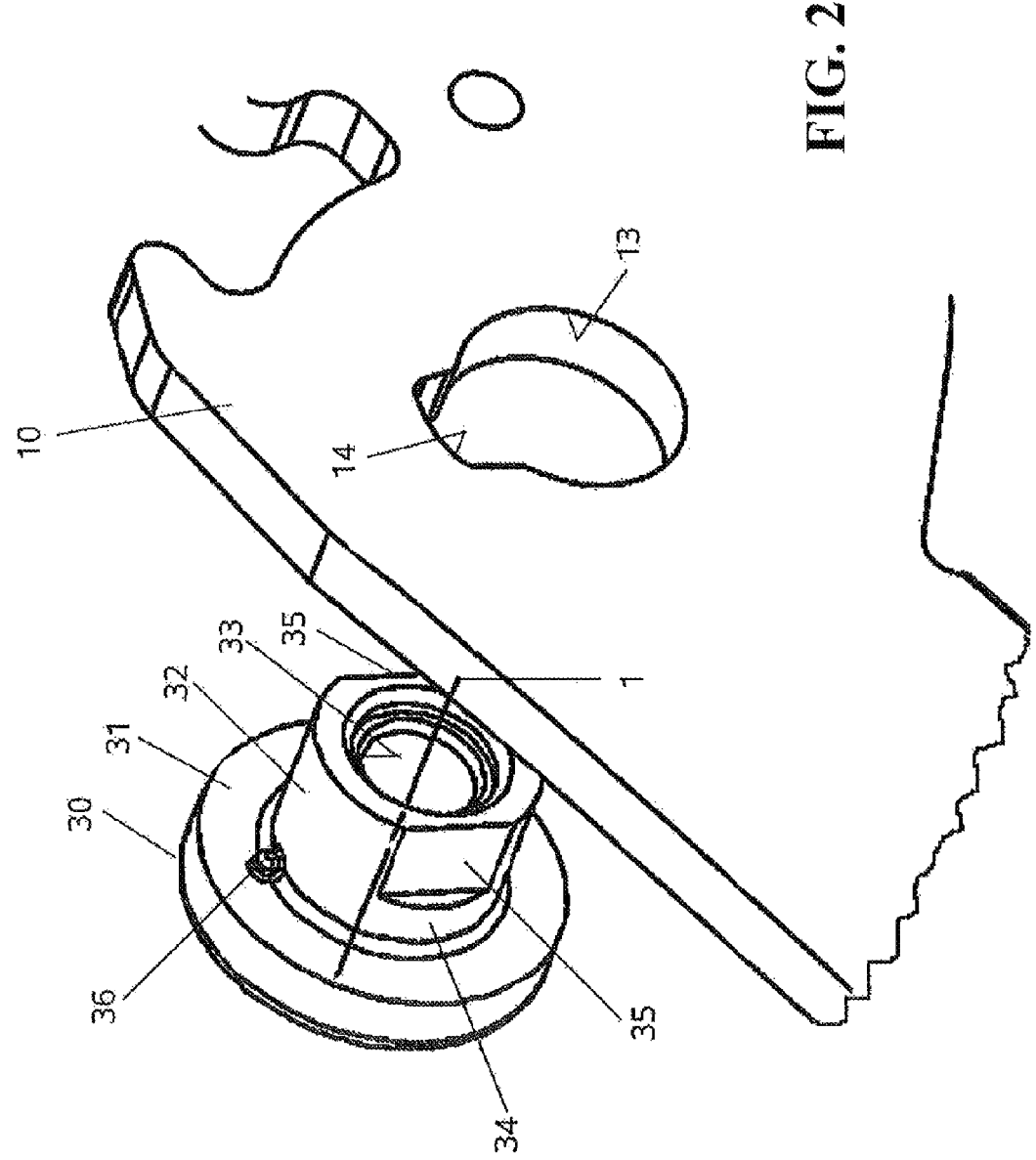
FIG. 2 shows further details of the pivot connection of the two blades.
Figure 3:
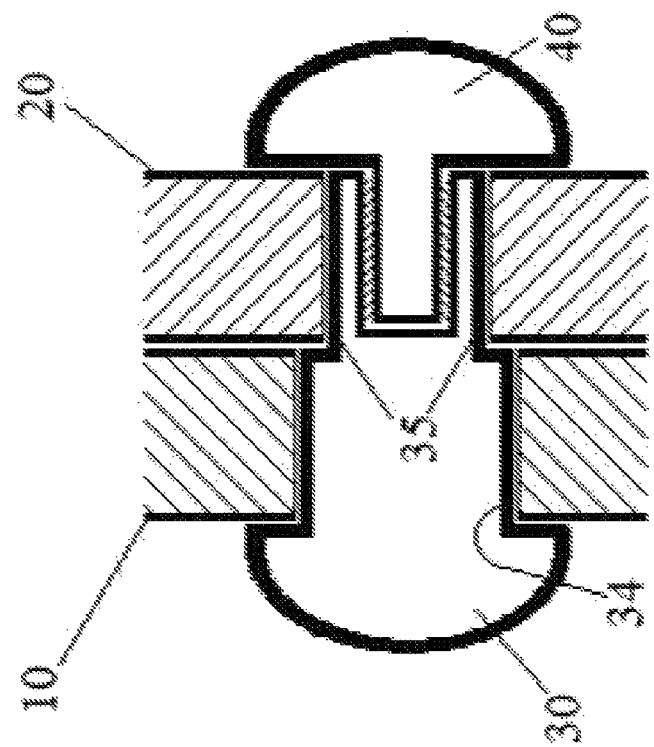
FIG. 3 shows a front cross-sectional view of the pivot connection of the two blades.
Figure 4:
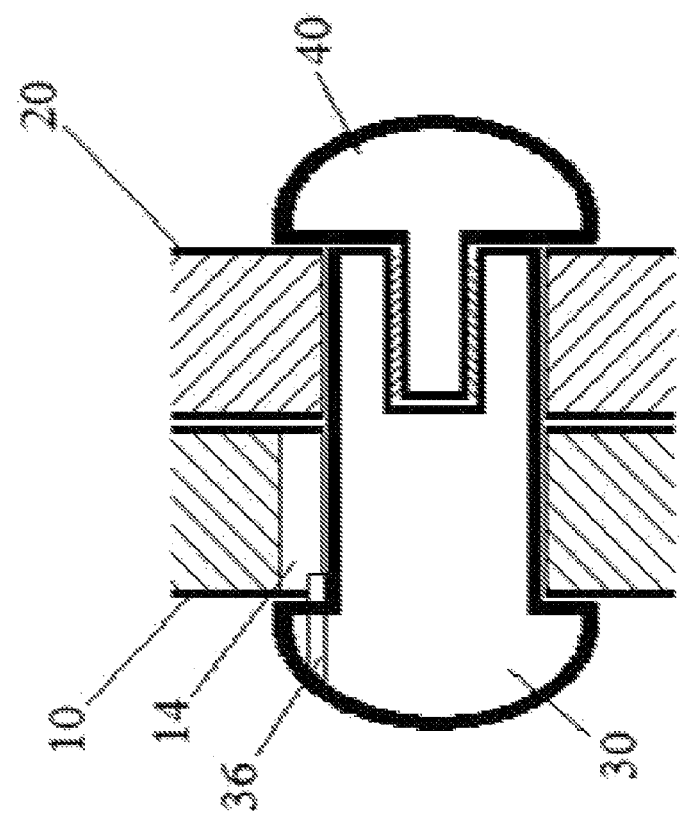
FIG. 4 shows a top cross-sectional view of the pivot connection of the two blades.

In FIGS. 1 and 2, the projection 36 is shown as a projection or pin extending through the flange 31 of the first mounting portion 30 or projecting therefrom.

In the same manner, the projection 36 could be formed by a projection starting from the first peripheral portion 34 or a rib on the circular first peripheral portion 34 of the pivot bolt 32 or by another type of projection.

Further, also a kinematic reversal might be possible wherein the bore of the first blade 10 is provided with a projection projecting into the inside of the bore and extending into a recess extending over a corresponding angular range of the first peripheral portion 34 of the pivot bolt 32.

The invention claimed is:

1. Garden shears comprising:
a first blade and a second blade having respective hand grips and pivotably mounted to one another by a pivot connection, wherein the pivot connection comprises a pivot bolt passing through respective bores of the first and second blades and rotatably secures the blades to one another in the axial direction of the pivot bolt, wherein:
the pivot bolt comprises, in its axial direction, successive first and second peripheral portions;
said first peripheral portion being disposed in the bore of the first blade and the second peripheral portion being disposed in the bore of the second blade, wherein the second blade is non-rotatable about the second peripheral portion of the pivot bolt and the first blade is rotatable relative to said second blade about the first peripheral portion of the pivot bolt over a limited angular range defined by a radial extension of the bore of the first blade;
wherein the first peripheral portion of the pivot bolt comprises a substantially circular cross section, and the second peripheral portion comprises at least a flat which engages with a corresponding flat of the bore of the second blade, whereas the pivot bolt includes a projection extending from the first peripheral portion and is received within the radial extension of the bore of the first blade; and
wherein the pivot bolt comprises, at its end adjacent to the first peripheral portion, a radially projecting flange in abutment with a surface of an outer main surface of the first blade, and wherein the projection is formed by a pin extending axially through the flange into a region adjacent to the first peripheral portion.

2. The garden shears as claimed in claim 1, wherein the first peripheral portion and the second peripheral portion have an axial length which substantially corresponds to a thickness of a material of the first and second blades, respectively, in the region of the bore of the first and second blades.

3. The garden shears as claimed in claim 1, wherein the pivot connection further comprises a second portion having a flange with a surface which abuts on an outer main surface of the second blade.

4. The garden shears as claimed in claim 3, wherein the pivot bolt comprises at its end adjacent the second peripheral portion a threaded bore, whereas the second portion of the pivot connection comprises a threaded stud which is screwed into the threaded bore.

5. The garden shears as claimed in claim 3, wherein the pivot bolt is provided with a threaded portion constituting an extension of the second peripheral portion, a threaded nut positioned on the outer main surface of the second blade and forming the second portion of the pivot connection being screwable onto the threaded portion.

6. The garden shears of claim 1, wherein the radial extension of the bore of the first blade is defined by a first end wall extending radially outward, a second end wall extending radially outward, and a third wall extending circumferentially between the first and second end walls.

7. The garden shears of claim 6, wherein contact between the projection of the pivot bolt and the first and second end walls of the radial extension of the first blade defines the angular range of rotation of the first blade relative to the pivot bolt and the second blade.

\* \* \* \* \*